(12) United States Patent
Lu et al.

(10) Patent No.: US 11,340,118 B2
(45) Date of Patent: May 24, 2022

(54) METHOD FOR HIGH-ACCURACY WAVEFRONT MEASUREMENT BASE ON GRATING SHEARING INTERFEROMETRY

(71) Applicant: Shanghai Institute of Optics And Fine Mechanics, Chinese Academy of Sciences, Shanghai (CN)

(72) Inventors: Yunjun Lu, Shanghai (CN); Feng Tang, Shanghai (CN); Xiangzhao Wang, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 0 days.

(21) Appl. No.: 17/153,783

(22) Filed: Jan. 20, 2021

(65) Prior Publication Data

US 2022/0074793 A1 Mar. 10, 2022

(30) Foreign Application Priority Data

Sep. 8, 2020 (CN) .......................... 202010934328.6

(51) Int. Cl.
   *G01J 9/02* (2006.01)
   *G01B 9/02098* (2022.01)
   *G01J 9/00* (2006.01)

(52) U.S. Cl.
   CPC ........ *G01J 9/0215* (2013.01); *G01B 9/02098* (2013.01); *G01J 2009/002* (2013.01); *G01J 2009/0219* (2013.01)

(58) Field of Classification Search
   None
   See application file for complete search history.

(56) References Cited

U.S. PATENT DOCUMENTS 7,889,356 B2 * 2/2011 Kuchel ................. G01J 9/0215
                                                      250/237 G
9,766,154 B2 * 9/2017 Dai ....................... G03F 7/7085
                         (Continued)

FOREIGN PATENT DOCUMENTS

CN          104111120 A       10/2014

OTHER PUBLICATIONS

J. Braat et al., "Improved Ronchi test with extended source," Journal of the Optical Society of America A., vol. 16, No. 1, pp. 131-140 (1999).

(Continued)

*Primary Examiner* — Violeta A Prieto
(74) *Attorney, Agent, or Firm* — Mei & Mark LLP; Manni Li

(57) ABSTRACT

A method for high-accuracy wavefront measurement based on grating shearing interferometry, which adopts a grating shearing interferometer system comprising an illuminating system, an optical imaging system under test, an object plane diffraction grating plate, an image plane diffraction grating plate, a two-dimensional photoelectric sensor, and a calculation processing unit. The object plane diffraction grating plate and the image plane diffraction grating plate are respectively arranged on the object plane and the image plane of the optical imaging system under test. The shearing phase of $1^{st}$-order diffracted beam and $-1^{st}$-order diffracted beam is exactly extracted through phase shifting method, and the original wavefront is obtained by carrying out reconstruction algorithm according to a shear ratio of 2s, such that the accuracy of wavefront measurement of the optical imaging system under test is improved, wherein s is the shear ratio of the grating shearing interferometer.

3 Claims, 3 Drawing Sheets

(56) References Cited

U.S. PATENT DOCUMENTS

| | | | |
|---|---|---|---|
| 10,697,852 B2 * | 6/2020 | Wegmann | G03F 7/706 |
| 10,969,274 B2 * | 4/2021 | Lu | G03F 7/706 |
| 11,009,336 B2 * | 5/2021 | Lu | G01J 9/0215 |
| 11,029,611 B2 * | 6/2021 | Tang | G03F 7/706 |
| 2005/0007602 A1 * | 1/2005 | Haidner | G03F 7/706 |
| | | | 356/521 |
| 2006/0001890 A1 * | 1/2006 | Poultney | G03F 7/706 |
| | | | 356/521 |
| 2010/0141959 A1 * | 6/2010 | Kuchel | G01J 9/0215 |
| | | | 356/521 |
| 2015/0160073 A1 * | 6/2015 | Otaki | G01M 11/0264 |
| | | | 356/520 |
| 2017/0131176 A1 * | 5/2017 | Dai | G03F 7/706 |
| 2019/0212226 A1 * | 7/2019 | Wegmann | G01J 9/0215 |
| 2020/0292296 A1 | 9/2020 | Lu et al. | |
| 2020/0292384 A1 | 9/2020 | Lu et al. | |
| 2021/0026250 A1 * | 1/2021 | Tang | G03F 7/706 |

OTHER PUBLICATIONS

Yucong Zhu et al., "Shearing Interferometry for at wavelength wavefront measurement of extreme-ultraviolet lithography projection optics," Japanese Journal of Applied Physics, vol. 42, pp. 5844-5847 (2003).

Yucong Zhu et al., "Method for designing phase-calculation algorithms for two-dimensional grating phase shifting interferometry," Applied Optics, vol. 50, No. 18, pp. 2815-2822 (Jun. 20, 2011).

* cited by examiner

METHOD FOR HIGH-ACCURACY WAVEFRONT MEASUREMENT BASE ON GRATING SHEARING INTERFEROMETRY

CROSS-REFERENCE TO RELATED APPLICATIONS

The subject application claims priority to Chinese Application No. 202010934328.6 filed Sep. 8, 2020 in China. The Chinese priority application is incorporated herein by reference.

TECHNICAL FIELD

The present invention relates to optical measurement, in particular to a wavefront measurement algorithm of a grating shearing interferometer, which is used in the wavefront measurement device and measurement method of the projection lens of lithography or other optical imaging systems that are based on the grating shearing interferometry.

BACKGROUND OF THE INVENTION

The grating shearing interferometer has the advantages of a common optical path, no need for extra ideal reference, high-accuracy, high sensitivity, simple structure, etc. In the phase-shifting interferometry, a series of shearing interferograms with different phase-shifting amounts are acquired by transversely moving the grating, the shearing phase is obtained by calculating, and then the wavefront aberration of the system under test is determined.

For shearing interferometer, using shearing interferograms to extract the shearing phase with high-accuracy is the premise of obtaining the high-accuracy measurement of the final wavefront aberration.

Unlike the interference between two beams in general, multi-stage high-order diffracted beams exist in the interference field of a shearing interferometer due to the diffraction of the image plane grating, and interference can occur between the multi-stage diffracted light. The incoherent source and the object plane grating are adopted to modulate the coherence of the light source from illumination system so that the interference between high-order diffracted beams is suppressed and the interference field is simplified to a certain extent, but on the receiving plane of a detector, the interference between high-order other than $-\pm 1^{st}$-order beams and $0^{th}$-order beam still exists, and the extraction accuracy of the shearing phase is seriously reduced.

Joseph Braat et al., "Improved Ronchi test with extended source," Journal of the Optical Society of America, A Vol. 16., No. 1, pp:131-140 (1999), discloses a grating shearing interferometer modified by an extended light source, which uses only the interference of $\pm 1^{st}$-order and $0^{th}$-order beams for phase retrieval without considering the effect of the high-order diffracted beams, As the numerical aperture of the optical system under test increases continuously, more and more high-order diffracted components exist in the system so that a large number of system errors are introduced when the method is used for phase retrieval, and the phase retrieval accuracy is seriously reduced.

Yucong Zhu et al., "Shearing Interferometry for at wavelength wavefront measurement of extreme-ultraviolet lithography projection optics," Jpn. J. Appl. Phys, Vol. 42, pp. 5844-5847 (2003), discloses that, by using a dual window mask, the high-order diffracted beams are filtered out which ensures that only $1^{st}$-order diffracted beam participates in the two-beam interference. The disadvantage of the method is that when the shear direction or the shear ratio is changed, the mask filter needs to be replaced synchronously, which causes inconvenience in measurement operation and increases the complexity of the mechanical structure.

Both Yucong Zhu et al., "Method for designing phase-calculation algorithms for two-dimensional grating phase shifting interferometry," Applied Optics, 50(18): pp. 2815-2822 (2011) and Chinese Invention Patent No. 201410360070.8 to Wu, Feibin et al. adopt the interference of $\pm 1^{st}$-order diffracted beams and $0^{th}$-order beam to carry out phase retrieval, both of which are common in that certain phase-shifting methods are adopted to eliminate the influence of the $\pm 3^{rd}$-order and $\pm 5^{th}$-order high-order diffracted beams on the phase retrieval, resulting in the improvement in the phase extraction accuracy to a certain extent. However, in the presence of diffracted beams of $\pm 7^{th}$-order and higher orders, the methods still fail to eliminate the influence of these high-order diffracted beams.

Both China invention patent applications CN201910183242.1 to Lu, Yunjun et al. (corresponding to U.S. Patent Application Publication No. 2020/0292384A1 published on Sep. 17, 2020) and CN201910183243.6 to Lu, Yunjun et al. (corresponding to U.S. Patent Application Publication No. 2020/0292296A1 published on Sep. 17, 2020) eliminate the influence of all higher order diffracted beams except $\pm 1^{st}$-order diffracted beams in a grating shearing interferometer system; both Chinese invention patent applications and their counterpart U.S. patent application publications are incorporated herein by reference in their entirety. But in the method, a differential phase of $1^{st}$-order diffracted beams and $0^{th}$-order diffracted beam is used as a shearing phase, and the shearing phase of $1^{st}$-order diffracted beam and $0^{th}$-order beam and the shearing phase of $0^{th}$-order beam and $-1^{st}$-order diffracted beam are considered to be equal. This approximate processing results in errors in the extraction of the shearing phase of $1^{st}$-order and $0^{th}$-order diffracted beam. The phase retrieval error is related to the shear ratio, the larger the shear ratio, the larger the error.

For a shearing interferometer measuring system with a large numerical aperture, a grating shearing interferometer system with simple structure and convenient operation for high-order diffracted beams is not available at present, and a grating interferometer detecting system and a detecting method which can accurately carry out phase retrieval are also not available as well.

SUMMARY OF INVENTION

The present invention overcomes the defects of the existing technology and provides a method that is capable of eliminating the influence of all high-order diffracted beams except $\pm 1^{st}$-order diffracted beams in the grating shearing interferometer system, carries out the wavefront reconstruction by using the shearing phase of $-1^{st}$-order and $1^{st}$-order beams, eliminates the error in the shearing phase retrieval process, and can theoretically achieve accurate measurement of wavefront aberration of the optical system under test for any shear ratio and numerical aperture.

To achieve the above object, the technical solution of the present invention is as follows: step (i) placing an optical imaging system under test (3) in a grating shearing interferometer system, positioning a illuminating system (8) on an object space of the optical imaging system under test (3) and an image plane diffraction grating plate (4) on an image space of the optical imaging system under test (3), adjusting a first three-dimensional stage (2) to position an object plane diffraction grating plate (1) on an object plane of the optical imaging system under test (3), and adjusting a second three-dimensional stage (5) to position the image plane diffraction grating plate (4) on an image plane of the optical imaging system under test (3);

step (ii) moving the first three-dimensional stage (2) to enable grating line on the object plane diffraction grating plate (1) along a first grating (101) in a y axis direction to move into an object space field-of-view point position of the optical imaging system under test (3), moving the second three-dimensional stage (5) to enable a chessboard grating or a one-dimensional grating in a corresponding direction on the image plane diffraction grating plate (4) to move into the image space field-of-view point position of the imaging system under test (3), wherein an included angle between a diagonal line direction of the chessboard grating and an x axis or the y axis is 45 degrees, obtaining a series of shearing interferograms in the x axis direction by object plane or image plane grating phase shifting, solving and unwrapping to obtain a shearing phase $\varphi_x$ in the x axis direction:

$$\varphi_x = \text{unwrap}\left(\arctan\left[\frac{2a_1(\sin\varphi_1 + \sin\varphi_{-1})}{2a_1(\cos\varphi_1 + \cos\varphi_{-1})}\right]\right),$$

wherein, at the moment, $\varphi_{-1}=\phi(x, y)-\phi(x-\Delta, y)$ represents a shearing phase of $0^{th}$-order beam and $-1^{st}$-order diffracted beam in the x axis direction, and $\varphi_1=\phi(x+\Delta, y)-\phi(x, y)$ represents a shearing phase of $1^{st}$-order diffracted beam and $0^{th}$-order beam in the x axis direction, and A is an offset of $1^{st}$-order diffracted beam relative to $0^{th}$-order beam received on a two-dimensional photoelectric detector (6), and function unwrap(x) represents unwrapping x;

step (iii) moving the first three-dimensional stage (2) to enable a second grating (102) of the grating line on the object plane diffraction grating plate (1) along the x axis direction to move into the object space field-of-view point position of the optical imaging system under test (3); obtaining a series of shearing interferograms in the y axis direction by object plane or image plane grating phase shifting, and solving and unwrapping to obtain a shearing phase $\varphi_y$ in the y axis direction:

$$\varphi_y = \text{unwrap}\left(\arctan\left[\frac{2a_1(\sin\varphi_1 + \sin\varphi_{-1})}{2a_1(\cos\varphi_1 + \cos\varphi_{-1})}\right]\right),$$

wherein, at the moment, $\varphi_{-1}=\phi(x, y)-\phi(x-\Delta, y)$ represents the shearing phase of $0^{th}$-order beam and $-1^{st}$-order diffracted beam in the y axis direction, and $\varphi_1=\phi(x+\Delta, y)-\phi(x, y)$ represents the shearing phase of $1^{st}$-order diffracted beam and $0^{th}$-order beam in the y axis direction; and step (iv) defining a shear ratio s between $+1^{st}$-order diffracted beam and $0^{th}$-order diffracted light; multiplying the shearing phase $\varphi_x$ in the x axis direction by 2 to obtain a differential wavefront with a shear ratio of 2s in the x axis direction $\Delta W_x=2\varphi_x=\phi(x+\Delta, y)-\phi(x-\Delta, y)$; multiplying the shearing phase $\varphi_y$ in the y axis direction by 2 to obtain a differential wavefront with a shear ratio of 2s in the y axis direction $\Delta W_y=2\varphi_y=\phi(x, y+\Delta)-\phi(x, y-\Delta)$; and obtaining a wavefront aberration W of the optical imaging system under test (3) by wavefront reconstruction algorithm of grating shearing interferometer on $\Delta W_x$ and $\Delta W_y$ according to a shear ratio of 2s.

Further, the detection method of the present invention is conducted in the grating shearing interferometer system that comprise the illuminating system (8), the object plane diffraction grating plate (1), the first three-dimensional stage (2), the image plane diffraction grating plate (4), the second three-dimensional stage (5), the two-dimensional photoelectric sensor (6), and a calculation processing unit (7).

In the grating shearing interferometer system of the present invention, the illuminating system (8) outputs spatially incoherent light; the object plane diffraction grating plate (1) is fixed on the first three-dimensional stage (2); the image plane diffraction grating plate (4) is fixed on the second three-dimensional stage (5); the object plane diffraction grating plate (1) comprises two sets of one-dimensional gratings with vertical grating line directions; the image plane diffraction grating plate (4) comprises one set of chessboard grating or two groups of one-dimensional grating with vertical grating line directions; an output end of the two-dimensional photoelectric sensor (6) is connected with the calculation processing unit (7), and a xyz coordinate system is established where a z axis direction is along an optical axis direction of a shearing interferometer, the x axis is along a grating line direction of the second grating (102) on the object plane diffraction grating plate (1), the y axis is along the grating line direction of the first grating (101) on the object plane diffraction grating plate (1), and establishing that movement axes of the first three-dimensional stage (2) and the second three-dimensional stage (5) are respectively the x axis, the y axis, and the z axis.

The technical effect of the present invention is that, based on the shearing phase extraction algorithm of Chinese invention patent application numbers CN201910183242.1 and CN201910183243.6 to Lu, Yunjun et al. as discussed above, which are incorporated herein by reference, the present invention adopts the differential phase exactly equivalent to the differential wavefront of $1^{st}$-order beam and $-1^{st}$-order diffracted beam, then performs wavefront retrieval according to the shear ratio of 2s between $1^{st}$-order diffracted beam and $-1^{st}$-order diffracted beam, with no approximation during the entire process of calculating, improves the accuracy of wavefront measurement of the optical imaging system under test under test. The wavefront measurement method of grating shearing interference is optimized in algorithm to eliminate the interference of high-order diffracted beams, with no need of extra mechanical structure, and the measurement accuracy is improved theoretically, meanwhile the complexity of the mechanical structure of the measuring system is not increased.

Reference numbers used in the figures refer to the following structure: 1—object plane diffraction grating plate; 2—first three-dimensional stage; 3—optical imaging system under test; 4—image plane diffraction grating plate; 5—second three-dimensional stage; 6—two-dimensional photoelectric sensor; 7—calculation processing unit; 8—illuminating system.

DETAILED DESCRIPTION OF THE INVENTION

The present invention is further described in detail embodiments in connection with the drawings, however, the scope of the present invention should not be limited by the embodiments.

Figure 1:
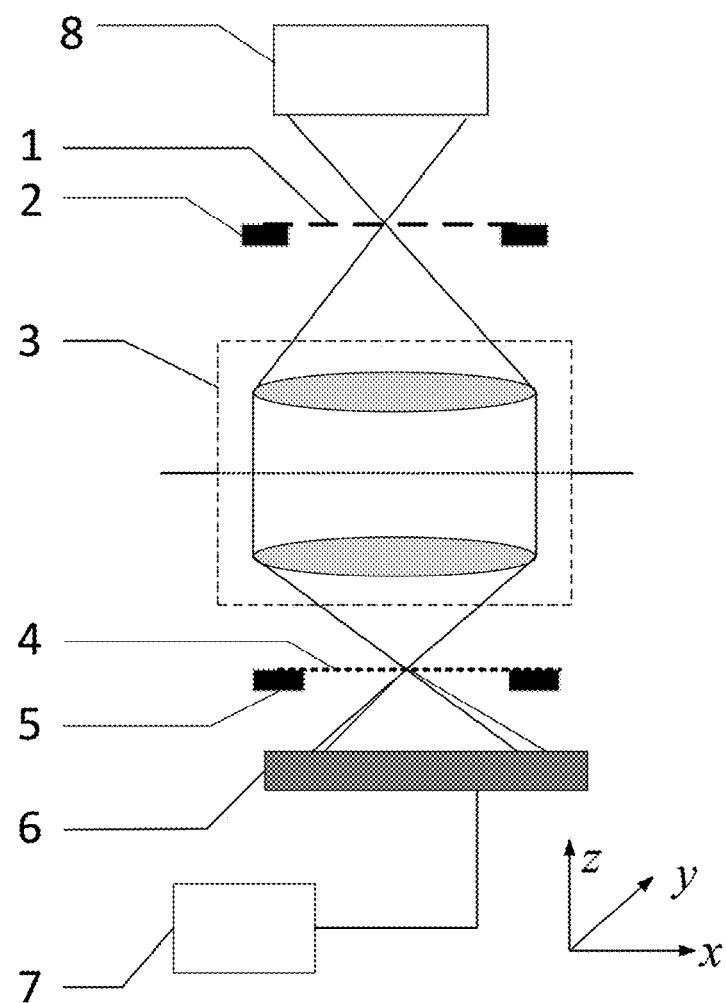
FIG. 1 shows the wavefront measurement device of grating shearing interferometer in the present invention.

The present invention discloses a method for high-accuracy wavefront measurement based on grating shearing interferometry that adopts a grating shearing interferometer as shown in FIG. 1. The device of the present invention comprises an illuminating system 8, an object plane diffraction grating plate 1, a first three-dimensional stage 2, an image plane diffraction grating plate 4, a second three-dimensional stage 5, a two-dimensional photoelectric sensor 6 and a calculation processing unit 7, wherein the illuminating system 8 outputs spatially incoherent light, the object plane diffraction grating plate 1 is fixed on the first three-dimensional stage 2, the image plane diffraction grating plate 4 is fixed on the second three-dimensional stage 5, and the output end of the two-dimensional photoelectric sensor 6 is connected with the calculation processing unit 7.

In the present invention, an xyz coordinate system is established, wherein the z axis direction is along the optical axis direction of the shearing interferometer, the x axis is along the grating line direction of the second grating 102 on the object plane diffraction grating plate 1, the y axis is along the grating line direction of the first grating 101 on the object plane diffraction grating plate 1, and the motion axes of the first three-dimensional stage 2 and the second three-dimensional stage 5 are respectively an x axis, a y axis and a z axis; the first three-dimensional stage 2 is used for moving the first grating 101 and the second grating 102 in the object plane diffraction grating plate 1 to the center of the object plane field of the optical imaging system under test 3; the second three-dimensional stage 5 is used for moving the checkerboard grating in the image plane diffraction grating plate 4 to the center of the image plane field of the optical imaging system under test 3, and carrying out specific periodic movement in the x axis direction and the y axis direction on the image plane diffraction grating plate 4; the two-dimensional photoelectric sensor 6 can be a charge coupled device (CCD) or a CMOS image sensor, and the test plane receives the shearing interference interferogram generated by the diffraction of a checkerboard grating; and the calculation processing unit 7 is used for acquiring and storing shearing interferograms, then processing and analyzing the shearing interferograms.

Figure 2:
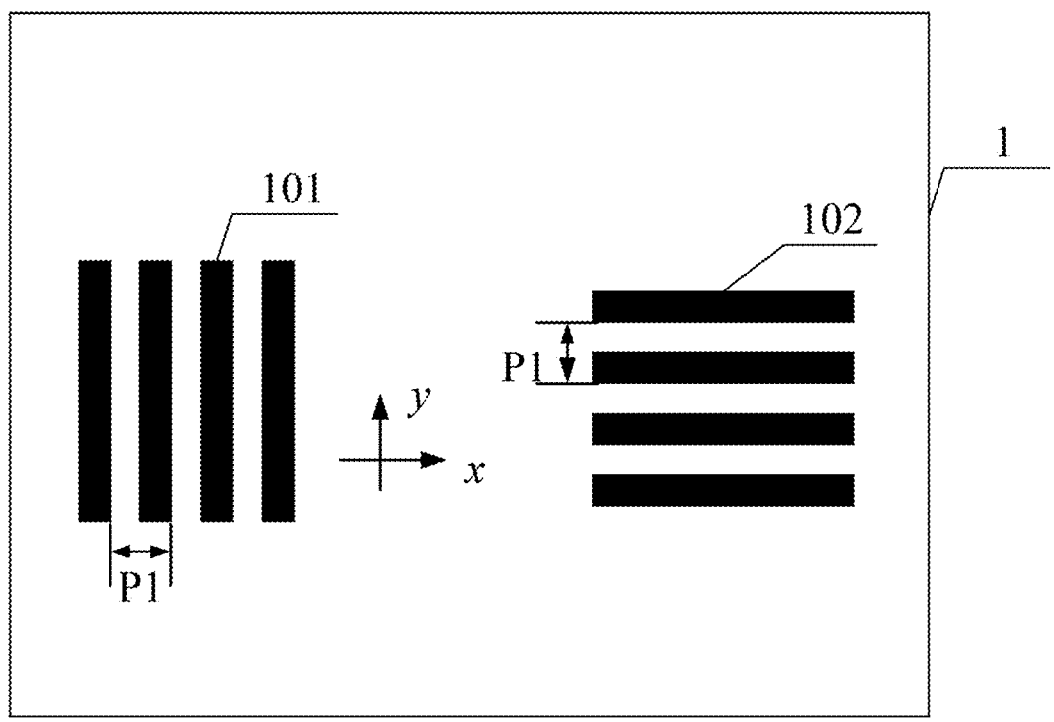
FIG. 2 shows the object plane diffraction grating plate in the present invention.

As shown in FIG. 2, the object plane diffraction grating plate 1 comprises two one-dimensional diffraction gratings, which are a first grating 101 with a grating line along the y axis direction and a second grating 102 with a grating line along the x axis direction respectively, wherein the period of the one-dimensional diffraction grating is P1 and the duty ratio is 50%. The first grating 101 and the second grating 102 can be phase gratings or amplitude gratings.

Figure 3:
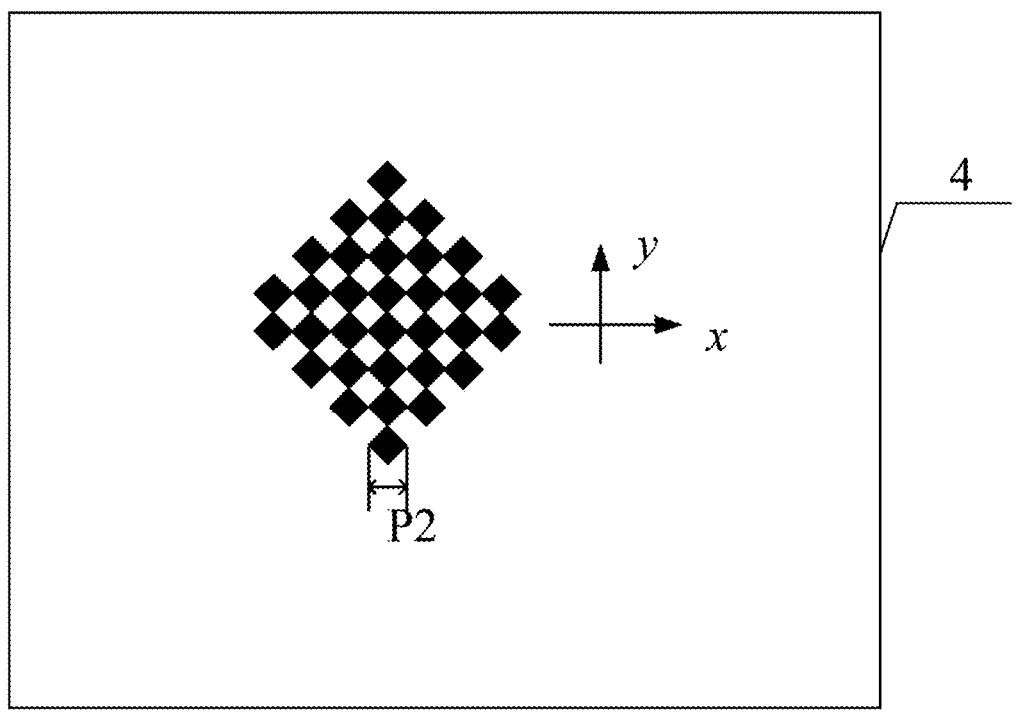
FIG. 3 shows the checkerboard grating of the image plane diffraction grating plate in the present invention.

As shown in FIG. 3, in the chessboard grating of the image plane diffraction grating plate 4, the chessboard grating is with a period of P2 and a duty ratio of 50%; the chessboard grating consists of square grids, and the diagonal direction of the square is along the x axis direction or the y axis direction; the chessboard grating can be a phase grating or an amplitude grating; the period P1 of the one-dimensional grating and the period P2 of the two-dimensional grating satisfy:

$$P1 = M \cdot P2 \tag{1}$$

wherein M is the magnification of the optical imaging system under test 3.

Figure 4:
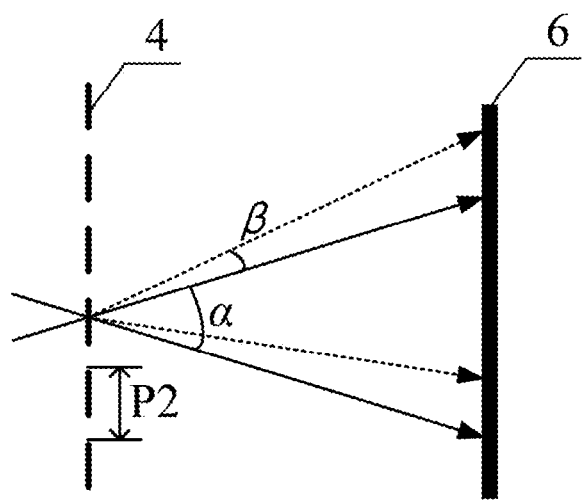
FIG. 4 is a diagram showing the relationship between the shear ratio s and the numerical aperture N.A. of the grating shearing interferometer system in the present invention.

FIG. 4 shows the relationship between the shear ratio s of the shearing interferometer system and the numerical aperture NA of the optical imaging system under test 3 and the period P2 of the image plane grating. The shear ratio is defined as the ratio of the diffraction angle to the full aperture angle (normalized shear ratio between $1^{st}$-order diffracted beam and $0^{th}$-order beam):

$$s = \frac{\beta}{\alpha} = \frac{\arcsin\left(\frac{\lambda}{P2}\right)}{2 \arcsin(NA)} \tag{2}$$

wherein, $\beta$ is the diffraction angle of $1^{st}$-order diffracted beam, and $\alpha$ is the full aperture angle of the beam.

Based on the grating shearing interferometer system, only high-order diffraction beams with odd-order are generated after passing through the chessboard grating of the image plane diffraction grating plate 4, and the spatial coherence of the optical field is modulated by combining with the linear gratings 101 or 102 on the object plane diffraction grating plate 1, so that only the interference between $0^{th}$-order beam and other high-order diffracted beams exists in the optical field, and there is no interference between these high-order diffracted beams. Taking the shearing direction along the x direction as an example, the interference field received by the two-dimensional photoelectric sensor 6 can be written as:

$$I(x, y) = A_0^2 + \sum_{m=-(2n+1)}^{m=2n+1} A_n^2 + \ldots + \\ 2 \sum_{m=1}^{m=2n+1} A_0 A_m \gamma_m \cos[\phi(x + m\Delta, y) - \phi(x, y) - \alpha_m] + \\ 2 \sum_{m=1}^{m=2n+1} A_0 A_m \gamma_m \cos[\phi(x, y) - \phi(x - m\Delta, y) - \alpha_m] \tag{3}$$

$(n = 0, 1, 2, \ldots)$

In the equation, $A_0$ is the amplitude of the $0^{th}$-order beam, $A_m$ is the amplitude of the $m^{th}$-order diffracted beam, is the optical path difference between the $m^{th}$-order diffracted beam and the $0^{th}$-order beam, $\phi(x, y)$ is the wavefront to be measured, $\gamma_m$ is the degree of coherence between the $m^{th}$-order diffracted beam and $0^{th}$-order beam, in is the diffraction order, and A is the offset of $1^{st}$-order diffracted beam relative to the $0^{th}$-order beam received by the two-dimensional photoelectric detector 6. Assuming $A_0$ is 1, the $A_m$ and $\gamma_m$ coefficients satisfy the following relationship:

$$A_m = \gamma_m = \frac{2}{m\pi} \tag{4}$$

When introducing a phase-shifting, the above equation can be written as:

$$I = I0 + \sum_{m=1}^{m=2n-1} a_m (\cos(\varphi_{-m} + m\delta) + \cos(\varphi_m + m\delta)) \tag{5}$$

Wherein $\varphi_{-m}=\phi(x, y)-\phi(x-m\Delta, y)$ represents the shearing phase of $0^{th}$-order beam and $-m^{th}$-order diffracted beam; $\varphi_m=\phi(x+m\Delta, y)-\phi(x, y)$ indicates the shearing phase of $m^{th}$-order diffracted beam and $0^{th}$-order beam.

The method for high-accuracy wavefront measurement using the above described grating shearing interferometer of the present invention comprises the following steps:

(1) placing the optical imaging system under test 3 in the grating shearing interferometer to enable the illuminating system 8 to be positioned on the object space of the optical imaging system under test 3, and the image plane diffraction grating plate 4 to be positioned on the image space of the optical imaging system under test 3, adjusting the first three-dimensional stage 2 to enable the object plane diffraction grating plate 1 to be positioned on the object plane of the optical imaging system under test 3, and adjusting the second three-dimensional stage 5 to enable the image plane diffraction grating plate 4 to be positioned on the image plane of the optical imaging system under test 3;

(2) determining the phase shifting amounts according to the shear ratio s of the grating shearing interferometer: firstly, determining the maximum diffraction order in the interference field to be $$m = \text{ceil}\left(\frac{1}{s}\right) - 1,$$

with the diffraction orders of the grating shearing interferometer system being sequentially $\pm 1, \pm 3, \ldots, \pm(2n-1)$, wherein n is the total number of positive high-order diffracted beam or the total number of negative high-order diffracted beams in the shearing interferometer system, $$n = \text{fix}\left(\frac{m+1}{2}\right),$$

function ceil (X) returns a minimum integer greater than or equal to X, and function fix (X) returns a maximum integer less than or equal to X; then according to n, determining the movement of the image plane diffraction grating plant 4 when an shearing interferogram acquired being $0, \frac{1}{4}, \frac{1}{2}, \frac{3}{4}$ and $$\frac{\alpha_i}{2\pi}, \frac{\pi - \alpha_i}{2\pi}, \frac{2\pi - \alpha_i}{2\pi}$$

times the chessboard grating period (where i=2, 3 ... n, $\alpha_i < \pi$ and $$\alpha_i \neq \frac{\pi}{2}),$$

the total number of steps being 3n+1;

(3) moving the first three-dimensional stage 2 to enable the first grating 101 of the grating line on the object plane diffraction grating plate 1 along the y axis direction to move into the object space field-of-view point position of the optical imaging system under test 3, and moving the second three-dimensional stage 5 to enable the chessboard grating or a one-dimensional grating in a corresponding direction on the image plane diffraction grating plate 4 to move into an image space field-of-view point position of the imaging system under test 3, wherein an included angle between a diagonal line of the chessboard grating and the x axis (or the y axis) is 45 degrees;

(4) moving the second three-dimensional stage 5 along the x axis direction according to the period $0, \frac{1}{4}, \frac{1}{2}, \frac{3}{4}$ and $$\frac{\alpha_i}{2\pi}, \frac{\pi - \alpha_i}{2\pi}, \frac{2\pi - \alpha_i}{2\pi}$$

times the chessboard grating period (wherein i=2, 3 ... n, $\alpha_i < \pi$ and $$\alpha_i \neq \frac{\pi}{2}),$$

wherein the two-dimensional photoelectric sensor 6 acquires one shearing interferogram $I_{\alpha_i}$ after each movement and transmits the shearing interferograms to the data processing unit 7 such that a total of 3n+1 shearing interferograms are obtained, an equation set consisting of n linear equation in the x direction is obtained, then the shearing phase is calculated according to the following method:

$$\begin{bmatrix} 1 & 1 & \ldots & 1 \\ \cos\alpha_2 & \cos 3\alpha_2 & \ldots & \cos(2n-1)\alpha_2 \\ \vdots & \vdots & \vdots & \vdots \\ \cos\alpha_n & \cos 3\alpha_n & \ldots & \cos(2n-1)\alpha_n \end{bmatrix} \begin{bmatrix} 2a_1(\cos\varphi_1 + \cos\varphi_{-1}) \\ 2a_3(\cos\varphi_3 + \cos\varphi_{-3}) \\ \vdots \\ 2a_{2n-1}(\cos\varphi_{2n-1} + \cos\varphi_{-(2n-1)}) \end{bmatrix} = \begin{bmatrix} I_0 - I_\pi \\ I_{\alpha_2} - I_{\pi-\alpha_2} \\ \vdots \\ I_{\alpha_n} - I_{\pi-\alpha_n} \end{bmatrix} \quad (7)$$

$$\begin{bmatrix} \sin\frac{\pi}{2} & \sin\frac{3\pi}{2} & \ldots & \sin\frac{(2n-1)\pi}{2} \\ \sin\alpha_2 & \sin 3\alpha_2 & \ldots & \sin(2n-1)\alpha_2 \\ \vdots & \vdots & \vdots & \vdots \\ \sin\alpha_n & \sin 3\alpha_n & \ldots & \sin(2n-1)\alpha_n \end{bmatrix} \begin{bmatrix} 2a_1(\sin\varphi_1 + \sin\varphi_{-1}) \\ 2a_3(\sin\varphi_3 + \sin\varphi_{-3}) \\ \vdots \\ 2a_{2n-1}(\sin\varphi_{2n-1} + \sin\varphi_{-(2n-1)}) \end{bmatrix} = \begin{bmatrix} I_{\frac{\pi}{2}} - I_{\frac{3\pi}{2}} \\ I_{\alpha_2} - I_{2\pi-\alpha_2} \\ \vdots \\ I_{\alpha_n} - I_{2\pi-\alpha_n} \end{bmatrix} \quad (8)$$

$2a_1(\cos \varphi_1 + \cos \varphi_{-1})$ and $2a_1(\sin \varphi_1 + \sin \varphi_{-1})$ and in the x direction are obtained by solving the linear equation sets (7) and (8) respectively, and the shearing phase $\varphi_x$ in the x axis direction is obtained by solving and unwrapping:

$$\varphi_x = \text{unwrap}\left(\arctan\left[\frac{2a_1(\sin\varphi_1 + \sin\varphi_{-1})}{2a_1(\cos\varphi_1 + \cos\varphi_{-1})}\right]\right), \quad (9)$$

at the moment, $\varphi_{-1}=\phi(x, y)-\phi(x-\Delta, y)$ represents the shearing phase of $0^{th}$-order beam and $-1^{st}$-order diffracted beam in the x axis direction, and $\varphi_1=\phi(x+\Delta, y)-\phi(x, y)$ represents the shearing phase of $1^{st}$-order diffracted beam and $0^{th}$-order beam in the x axis direction; and the function unwrap(x) represents unwrapping x;

(5) moving the first three-dimensional stage 2 to enable the second grating 102 of the grating line on the object plane diffraction grating plate 1 along the x axis direction to move into the object space field-of-view point position of the optical imaging system under test 3; performing the same movement on the second three-dimensional stage 5 along the y axis direction, acquiring one shearing interferogram $I_{\alpha_i}$ by the two-dimensional photoelectric sensor 6 after each movement and transmitting the shearing interferogram to the data processing unit 7, obtaining a total of 3n+1 shearing interference interferograms, obtaining an equation set consists of n linear equations in the y direction, calculating $2a_1(\cos \varphi_1 + \cos \varphi_{-1})$ and $2a_1(\sin \varphi_1 + \sin \varphi_{-1})$ in the y direction according to the equation (7) and the equation (8) as well, and solving and unwrapping to obtain a shearing phase $\varphi_y$ in the y axis direction:

$$\varphi_y = \text{unwrap}\left(\arctan\left[\frac{2a_1(\sin\varphi_1 + \sin\varphi_{-1})}{2a_1(\cos\varphi_1 + \cos\varphi_{-1})}\right]\right), \quad (10)$$

at the moment, $\varphi_{-1} = \phi(x, y) - \phi(x-\Delta, y)$ representing the shearing phase of $0^{th}$-order beam and $-1^{st}$-order diffracted beam in the y axis direction, and $\varphi_1 = \phi(x+\Delta, y) - \phi(x, y)$ representing the shearing phase of $1^{st}$-order diffracted beam and $0^{th}$-order beam in the y axis direction; and (6) defining a shear ratio s between $+1^{st}$-order diffracted beam and $0^{th}$-order beam;

multiplying the shearing phase $\varphi_x$ in the x axis direction by 2 to obtain a differential wavefront with a shear ratio of 2s in the x axis direction $\Delta W_x = 2\varphi_x = \phi(x+\Delta, y) - \phi(x-\Delta, y)$; multiplying the shearing phase $\varphi_y$ in the y axis direction by 2 to obtain a differential wavefront with a shear ratio of 2s in the y axis direction $\Delta W_y = 2\varphi_y = \phi(x, y+\Delta) - \phi(x, y-\Delta)$; and obtaining the wavefront aberration W of the optical imaging system under test 3 by wavefront reconstruction algorithm on $\Delta W_x$ and $\Delta W_y$ according to the shear ratio of 2s.

Additional description of step 6 is as follows:

deducing the shearing phase in the x axis direction is as follows:

$$\varphi_x = \arctan\left[\frac{2a_1(\sin\varphi_1 + \sin\varphi_{-1})}{2a_1(\cos\varphi_1 + \cos\varphi_{-1})}\right]$$

$$= \arctan\left[\frac{2a_1 2\sin\frac{\varphi_1+\varphi_{-1}}{2}\cos\frac{\varphi_1-\varphi_{-1}}{2}}{2a_1 2\cos\frac{\varphi_1+\varphi_{-1}}{2}\cos\frac{\varphi_1-\varphi_{-1}}{2}}\right]$$

$$= \frac{\varphi_1 + \varphi_{-1}}{2}$$

$$= \frac{1}{2}\{[\phi(x+\Delta, y) - \phi((x, y)] + [\phi(x, y) - \phi((x-\Delta, y)]\}$$

$$= \frac{\phi(x+\Delta, y) - \phi(x-\Delta, y)}{2}$$

wherein it can be seen that the shearing phase $\varphi_x$ in x direction is equivalent to half of the shearing phase of $1^{st}$-order diffracted beam and $-1^{st}$-order diffracted beam in the physical sense, and the shear ratio is 2s;

in the same way, the shearing phase in the y axis direction can be represented as $$\varphi_y = \frac{\phi(x, y+\Delta) - \phi(x, y-\Delta)}{2},$$

which is also equivalent to half of the shearing phase of $1^{st}$-order diffracted beam and $-1^{st}$-order diffracted beam, with a shear ratio of 2s, where s is defined as the shear ratio between $1^{st}$-order diffracted beam and $0^{th}$-order beam.

In Chinese Invention Patent Applications 201910183242.1 and 201910183243.6 to Lu, Yunjun et al., as, approximate processing $\varphi_x \approx \varphi_1 \approx \varphi_{-1}$ is performed in the shearing phase extraction, the shearing phase $\varphi_x$ is approximately equal to the shearing phase of $1^{st}$-order diffracted beam and $0^{th}$-order beam in the physical sense, and the shear ratio is s; in the same way, the shearing phase $\varphi_y$ is approximately equal to the shearing phase of $1^{st}$-order diffracted beam and $0^{th}$-order beam, and the shear ratio is s. The differential phase retrieval error resulting from the approximation is $$\frac{\varphi_1 - \varphi_{-1}}{2},$$

and the inaccuracy in the shear ratio s during the wavefront reconstruction also results in wavefront error. In general, the larger the shear ratio s, the larger the error resulting from the $\varphi_1 \approx \varphi_{-1}$ approximation processing, and the larger the final measured wavefront aberration error.

The method of the present invention has the advantages of a large range of the measurable numerical aperture and the adjustable shear ratio of the grating interferometer, as well as the capability of accurately measuring the wavefront aberration of the optical imaging system under test, and the like.

Compared with Chinese Invention Patent Applications 201910183242.1 and 201910183243.6 to Lu, Yunjun et al, the present invention adopts the differential wavefront completely equivalent to $1^{st}$-order diffracted beam and $-1^{st}$-order diffracted beam, performs wavefront reconstruction strictly according to the shear ratio of 2s, obtains the original wavefront aberration from the shearing phase retrieval to the wavefront reconstruction, obtains the wavefront aberration accurately in the whole process without any approximation, as a result, improves the accuracy of wavefront aberration measurement of the optical imaging system under test. The method is optimized just by optimization of shearing phase retrieval algorithm with no need of extra mechanical structure, the interference of high-order diffracted beams are eliminated, as a result, the accuracy of wavefront aberration measurement is improved.

We claim:

1. A method for high-accuracy wavefront measurement based on grating shearing interferometry, comprising
   (i) placing an optical imaging system under test (3) in a grating shearing interferometer system,
   positioning an illuminating system (8) on an object space of the optical imaging system under test (3) and an image plane diffraction grating plate (4) on an image space of the optical imaging system under test (3),
   adjusting a first three-dimensional stage (2) to position an object plane diffraction grating plate (1) on an object plane of the optical imaging system under test (3), and adjusting a second three-dimensional stage (5) to position the image plane diffraction grating plate (4) on an image plane of the optical imaging system under test (3);

(ii) moving the first three-dimensional stage (2) to enable grating line on the object plane diffraction grating plate (1) along a first grating (101) in a y axis direction to move into an object space field-of-view point position of the optical imaging system under test (3), moving the second three-dimensional stage (5) to enable a checkerboard grating or a one-dimensional grating in a corresponding direction on the image plane diffraction grating plate (4) to move into the image space field-of-view point position of the imaging system under test (3), wherein an included angle between a diagonal line direction of the checkerboard grating and an x axis or the y axis is 45 degrees, obtaining a series of shearing interferograms in the x axis direction by object plane or image plane grating phase-shifting, and solving and unwrapping to obtain a shearing phase $\varphi_x$ in the x axis direction:

$$\varphi_x = \text{unwrap}\left(\arctan\left[\frac{2a_1(\sin\varphi_1 + \sin\varphi_{-1})}{2a_1(\cos\varphi_1 + \cos\varphi_{-1})}\right]\right),$$

wherein, at the moment, $\varphi_{-1}=\phi(x, y)-\phi(x-\Delta, y)$ represents a shearing phase of $0^{th}$-order beam and $-1^{st}$-order diffracted beam in the x axis direction, and $\varphi_1=\phi(x-\Delta, y)-\phi(x, y)$ represents a shearing phase of $1^{st}$-order diffracted beam and $0^{th}$-order beam in the x axis direction, and A is an offset of $1^{st}$-order diffracted beam relative to $0^{th}$-order beam received on a two-dimensional photoelectric detector (6), and function unwrap (x) represents unwrapping x;

(iii) moving the first three-dimensional stage (2) to enable a second grating (102) of the grating line on the object plane diffraction grating plate (1) along the x axis direction to move into the object space field-of-view point position of the optical imaging system under test (3);

obtaining a series of shearing interferograms in the y axis direction by object plane or image plane grating phase-shifting, and solving and unwrapping to obtain a shearing phase $\phi_y$ in the y axis direction:

$$\varphi_y = \text{unwrap}\left(\arctan\left[\frac{2a_1(\sin\varphi_1 + \sin\varphi_{-1})}{2a_1(\cos\varphi_1 + \cos\varphi_{-1})}\right]\right),$$

wherein, at the moment, $\varphi_{-1}=\phi(x, y)-\phi(x-\Delta, y)$ represents the shearing phase of $0^{th}$-order beam and $-1^{st}$-order diffracted beam in they axis direction, and $\varphi_1=\phi(x+\Delta, y)-\phi(x, y)$ represents the shearing phase of $1^{st}$-order diffracted beam and $0^{th}$-order beam in the y axis direction;

(iv) defining a shear ratio s between $+1^{st}$-order diffracted beam and $0^{th}$-order beam;

multiplying the shearing phase $\varphi_x$ in the x axis direction by 2 to obtain a differential wavefront with a shear ratio of 2s in the x axis direction $\Delta W_x=2\varphi_x=\phi(x+\Delta, y)-\phi(x-\Delta, y)$;

multiplying the shearing phase $\varphi_y$ in the y axis direction by 2 to obtain a differential wavefront with a shear ratio of 2s in the y axis direction $\Delta W_y=2\varphi_y=\phi(x, y+\Delta)-\phi(x, y-\Delta)$; and obtaining a wavefront aberration W of the optical imaging system under test (3) by using wavefront reconstruction algorithm of shearing interferometer on $\Delta W_x$ and $\Delta W_y$ according to a shear ratio of 2s, wherein the grating shearing interferometer system comprise the illuminating system (8), the object plane diffraction grating plate (1), the first three-dimensional stage (2), the image plane diffraction grating plate (4), the second three-dimensional stage (5), the two-dimensional photoelectric sensor (6), and a calculation processing unit (7);

the illuminating system (8) outputs spatially incoherent light;

the object plane diffraction grating plate (1) is fixed on the first three-dimensional stage (2);

the image plane diffraction grating plate (4) is fixed on the second three-dimensional stage (5);

the object plane diffraction grating plate (1) comprises two sets of one-dimensional gratings with vertical grating line directions;

the image plane diffraction grating plate (4) comprises one set of checkerboard grating or two groups of one-dimensional grating with vertical grating line directions;

an output end of the two-dimensional photoelectric sensor (6) is connected with the calculation processing unit (7), and a xyz coordinate system is established where z axis direction is along the optical axis direction of the grating shearing interferometer, the x axis is along a grating line direction of the second grating (102) on the object plane diffraction grating plate (1), the y axis is along the grating line direction of the first grating (101) on the object plane diffraction grating plate (1), and establishing that movement axes of the first three-dimensional stage (2) and the second three-dimensional stage (5) are respectively the x axis, the y axis, and the z axis.

2. The method according to claim 1, wherein a ratio of a period of the one-dimensional grating on the object plane diffraction grating plate (1) to a period of the checkerboard grating or the one-dimensional grating on the image plane diffraction grating plate (4) is equal to a magnification of the optical imaging system under test (3).

3. The method according to claim 1, wherein the duty-cycle of the object plane diffraction grating and the image plane diffraction grating is 50%.

\* \* \* \* \*